United States Patent
Ziminsky

(10) Patent No.: US 12,503,958 B1
(45) Date of Patent: Dec. 23, 2025

(54) CLEARANCE PROBE ASSEMBLY USING REPLENISHABLE, CONTACTING ELONGATED CLEARANCE TIP

(71) Applicant: GE Vernova Infrastructure Technology LLC, Greenville, SC (US)

(72) Inventor: Willy S. Ziminsky, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/207,845

(22) Filed: May 14, 2025

(51) Int. Cl.
| | |
|---|---|
| G01B 21/16 | (2006.01) |
| F01D 11/20 | (2006.01) |
| F01D 21/00 | (2006.01) |
| G01M 15/02 | (2006.01) |
| G01M 15/14 | (2006.01) |

(52) U.S. Cl.
CPC ............ *F01D 21/003* (2013.01); *F01D 11/20* (2013.01); *G01B 21/16* (2013.01); *G01M 15/02* (2013.01); *G01M 15/14* (2013.01); *F05D 2260/83* (2013.01)

(58) Field of Classification Search
CPC ...... F01D 21/003; F01D 11/20; G01M 15/02; G01M 15/14; F05D 2260/83
See application file for complete search history.

(56) References Cited

U.S. PATENT DOCUMENTS

| | | | |
|---|---|---|---|
| 10,077,992 B2* | 9/2018 | Warren | F01D 21/04 |
| 2016/0312645 A1* | 10/2016 | Ribarov | F01D 25/24 |
| 2017/0343334 A1* | 11/2017 | Whitlock | G01B 11/14 |
| 2019/0170011 A1* | 6/2019 | Warren | G01H 11/06 |
| 2021/0102474 A1* | 4/2021 | Paulino | F01D 11/122 |

* cited by examiner

*Primary Examiner* — Gerald L Sung
*Assistant Examiner* — Jacek Lisowski
(74) *Attorney, Agent, or Firm* — James Pemrick; Charlotte Wilson; Hoffman Warnick LLC

(57) ABSTRACT

A probe assembly for determining a clearance between a stationary component and a rotating component is provided. A gas turbine system and a related method are also provided. The probe assembly includes an elongated clearance tip extending from the stationary component toward the rotating component. A controller is configured to determine a clearance between the stationary component and the rotating component based on a known length of the elongated clearance tip extending from the stationary component at a time of contact with the rotating component. A tip advancement system is configured to advance a new elongated clearance tip toward the rotating component from the stationary component in response to the elongated clearance tip breaking from the contact with the rotating component.

20 Claims, 4 Drawing Sheets

CLEARANCE PROBE ASSEMBLY USING REPLENISHABLE, CONTACTING ELONGATED CLEARANCE TIP

TECHNICAL FIELD

The disclosure relates generally to analysis of components and, more specifically, to a probe assembly for determining a clearance between a rotating component (e.g., a rotating blade of a gas turbine) and a stationary component (e.g., a casing of the gas turbine) using a replenishable, contacting elongated clearance tip.

BACKGROUND

In the development, manufacturing, and servicing of turbomachinery, it may be desirable to measure the distance between the tip or outer end of a rotating blade, or other similarly situated rotating component, and the inner surface of the stationary casing of the machine where the component is installed. Although such components should be kept out of contact with the casing, smaller clearances, i.e., distances, between the casing and rotating component may improve various operational aspects of the turbomachine (e.g., efficiency and performance). Measuring the clearance also may be relevant to product validation, health monitoring of the turbomachine, accuracy of feedback in control systems, and/or product diagnostics.

Non-contact probes have been used in some cases to measure the clearance between a rotating blade and the surrounding stationary casing. The non-contact probes rely on, for example, radiation (visible and/or invisible radiation), capacitance and/or inductance, to measure the desired distance. Non-contact probes require controlled conditions and advanced signal handling and/or advanced processing to correctly operate. In addition, some non-contact probes, e.g., capacitance probes, may be unreliable when manufactured to certain dimensions. These potential issues may be more pronounced with elevated firing temperatures, certain vibration limits, and user-defined quality constraints. A separate concern is maintaining structural integrity of the measurement assembly, e.g., maintaining probe operability in a variety of power generation modes. Other types of probes, such as radiation-based probes, may address some of these concerns but introduce other technical challenges.

BRIEF DESCRIPTION

All aspects, examples and features mentioned below can be combined in any technically possible way.

An aspect of the disclosure provides a probe assembly for determining a clearance between a stationary component and a rotating component, the probe assembly comprising: an elongated clearance tip extending from the stationary component toward the rotating component; a controller configured to determine a clearance between the stationary component and the rotating component based on a length of the elongated clearance tip extending from the stationary component at a time of contact with the rotating component; and a tip advancement system configured to advance a new elongated clearance tip toward the rotating component from the stationary component in response to the elongated clearance tip breaking from the contact with the rotating component.

Another aspect of the disclosure includes any of the preceding aspects, and the controller is operatively coupled to an impact sensor configured to sense contact of the elongated clearance tip with the rotating component.

Another aspect of the disclosure includes any of the preceding aspects, and the elongated clearance tip includes an electrically conductive material, and the controller detects contact of the elongated clearance tip with the rotating component in response to sensing of an electrical signal communicating through the elongated clearance tip and the rotating component.

Another aspect of the disclosure includes any of the preceding aspects, and the elongated clearance tip includes a piezoelectric material, wherein the controller detects contact of the elongated clearance tip with the rotating component in response to sensing of an electrical signal communicating through the elongated clearance tip and the rotating component.

Another aspect of the disclosure includes any of the preceding aspects, and the tip advancement system includes a supply of the new elongated clearance tip and means for advancing the new elongated clearance tip from the stationary component toward the rotating component.

Another aspect of the disclosure includes any of the preceding aspects, and the advancing means includes a screw advancement head and a drive motor operatively coupled to the screw advancement head to advance the new elongated clearance tip from the stationary component; and wherein the drive motor includes an encoder calibrated to identify the length of the new elongated clearance tip extending from the stationary component.

Another aspect of the disclosure includes any of the preceding aspects, and the drive motor is operatively coupled to the screw advancement head by a geared transmission.

Another aspect of the disclosure includes any of the preceding aspects, and the advancing means includes a spring-loaded clutch configured to advance the new elongated clearance tip from the stationary component by a predetermined length with each activation thereof.

Another aspect of the disclosure includes any of the preceding aspects, and further comprising a pneumatic ejector configured to eject a remaining portion of the elongated clearance tip from a portion of the stationary component in response to the elongated clearance tip breaking from the contact with the rotating component.

Another aspect of the disclosure includes any of the preceding aspects, and the elongated clearance tip includes graphite.

Another aspect of the disclosure includes a gas turbine (GT) system, comprising: a compressor section; a combustor section; a turbine section including a plurality of rotating blades within a stationary casing; and a probe assembly for determining a clearance between the stationary casing and at least one of the plurality of rotating blades, the probe assembly comprising: an elongated clearance tip extending from the stationary casing toward the plurality of rotating blades; a controller configured to determine a clearance between the stationary casing and a closest blade of the plurality of rotating blades based on a length of the elongated clearance tip extending from the stationary casing at a time of contact with the closest blade of the plurality of rotating blades; and a tip advancement system configured to advance a new elongated clearance tip toward the plurality of rotating blades from the stationary casing in response to the elongated clearance tip breaking from the contact with the closest blade of the plurality of rotating blades.

Another aspect of the disclosure includes any of the preceding aspects, and the controller is operatively coupled to an impact sensor configured to sense contact of the elongated clearance tip with the closest blade of the plurality of rotating blades.

Another aspect of the disclosure includes any of the preceding aspects, and the elongated clearance tip includes an electrically conductive material, and the controller detects contact of the elongated clearance tip with the closest blade of the plurality of rotating blades in response to sensing of an electrical signal communicating through the elongated clearance tip and the closest blade of the plurality of rotating blades.

Another aspect of the disclosure includes any of the preceding aspects, and the elongated clearance tip includes a piezoelectric material, wherein the controller detects contact of the elongated clearance tip with the closest blade of the plurality of rotating blades in response to sensing of an electrical signal communicating through the elongated clearance tip and the closest blade of the plurality of rotating blades.

Another aspect of the disclosure includes any of the preceding aspects, and the tip advancement system includes a supply of the new elongated clearance tip and means for advancing the new elongated clearance tip from the stationary casing toward the plurality of rotating blades.

Another aspect of the disclosure includes any of the preceding aspects, and the advancing means includes a screw advancement head and a drive motor operatively coupled to the screw advancement head to advance the new elongated clearance tip from the stationary casing; and wherein the drive motor includes an encoder calibrated to identify the length of the new elongated clearance tip extending from the stationary casing.

Another aspect of the disclosure includes any of the preceding aspects, and the drive motor is operatively coupled to the screw advancement head by a geared transmission.

Another aspect of the disclosure includes any of the preceding aspects, and the advancing means includes a spring-loaded clutch configured to advance the new elongated clearance tip from the stationary casing by a predetermined length with each activation thereof.

Another aspect of the disclosure includes any of the preceding aspects, and further comprising a pneumatic ejector configured to eject a remaining portion of the elongated clearance tip from a portion of the stationary casing in response to the elongated clearance tip breaking from the contact with the closest blade of the plurality of rotating blades.

Another aspect of the disclosure includes a method of determining clearance of a rotating component from a stationary component in a gas turbine system, the method comprising iteratively: positioning an elongated clearance tip extending from the stationary component toward the rotating component by a known length; and determining a clearance between the stationary component and the rotating component based on the known length of the elongated clearance tip extending from the stationary component at a time of contact of the elongated clearance tip with the rotating component.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
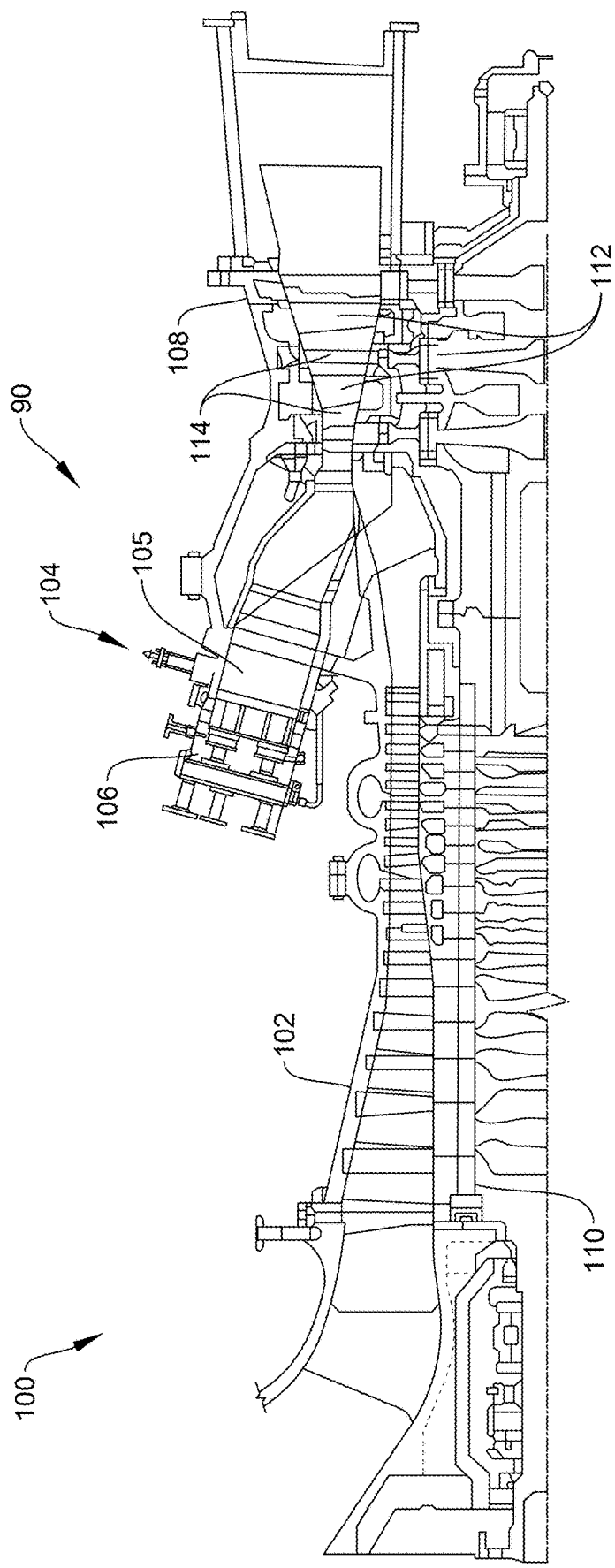
FIG. 1 is a simplified cross-sectional view of an illustrative gas turbine (GT) system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a probe assembly for measuring clearance of a rotating component from a stationary component in a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" or "fore" referring to the front or compressor end of the turbomachine, and "aftward" or "aft" referring to the rearward or turbine end of the turbomachine.

It is often required to describe parts that are at different radial positions with regard to a center axis. The term "axial" refers to movement or position parallel to an axis, e.g., an axis of a turbomachine. The term "radial" refers to movement or position perpendicular to an axis, e.g., an axis of a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a casing extending about an axis of a turbomachine. As indicated above, it will be appreciated that such terms may be applied in relation to the axis of the turbomachine or the longitudinal axis of the probe assembly.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present and that the description includes instances where the event occurs or the component is present and instances where the event does not occur or the component is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure include a probe assembly for determining a clearance between a stationary component and a rotating component. A gas turbine (GT) system that uses the probe assembly and a related method are also provided. The probe assembly includes an elongated clearance tip extending from the stationary component toward the rotating component. A controller is configured to determine a clearance between the stationary component and the rotating component based on a known length of the elongated clearance tip extending from the stationary component at a time of contact with the rotating component. A tip advancement system is configured to advance a new elongated clearance tip toward the rotating component from the stationary component in response to the elongated clearance tip breaking from the contact with the rotating component. The contacting nature of the probe and the breakable and replenishable clearance tip eliminates the complexity of current non-contact probes and expands the application of the probe assembly beyond just characterization tests. The probe assembly provides accurate and repeatable clearance testing.

Referring to the drawings, FIG. 1 is a schematic view of an illustrative non-limiting turbomachine 90 in the form of a combustion turbine or gas turbine (GT) system 100 (hereinafter, "GT system 100"). GT system 100 includes a compressor section 102 and a combustor section 104. Combustor section 104 includes combustors 105 each with a fuel nozzle assembly 106. GT system 100 also includes a turbine section 108 and a common rotor compressor/turbine shaft 110 (hereinafter referred to as "rotor shaft 110").

In one non-limiting embodiment, GT system 100 is a 7HA.02 engine, commercially available from GE Vernova, Cambridge, MA, USA. However, the present disclosure is not limited to any one particular GT system 100 and may be implemented in connection with other engines including, for example, the other HA, F, B, LM, GT, TM and E-class engine models of GE Vernova, and engine models of other companies. Further, the teachings of the disclosure are not necessarily applicable to only a GT system and may be applied to other types of turbomachines, e.g., steam turbines, jet engines, compressors, etc. The teachings of the disclosure are also not necessarily applicable to only turbomachines, i.e., they can be applied to any rotating machine in which a clearance between rotating and stationary components is desired.

Figure 2:
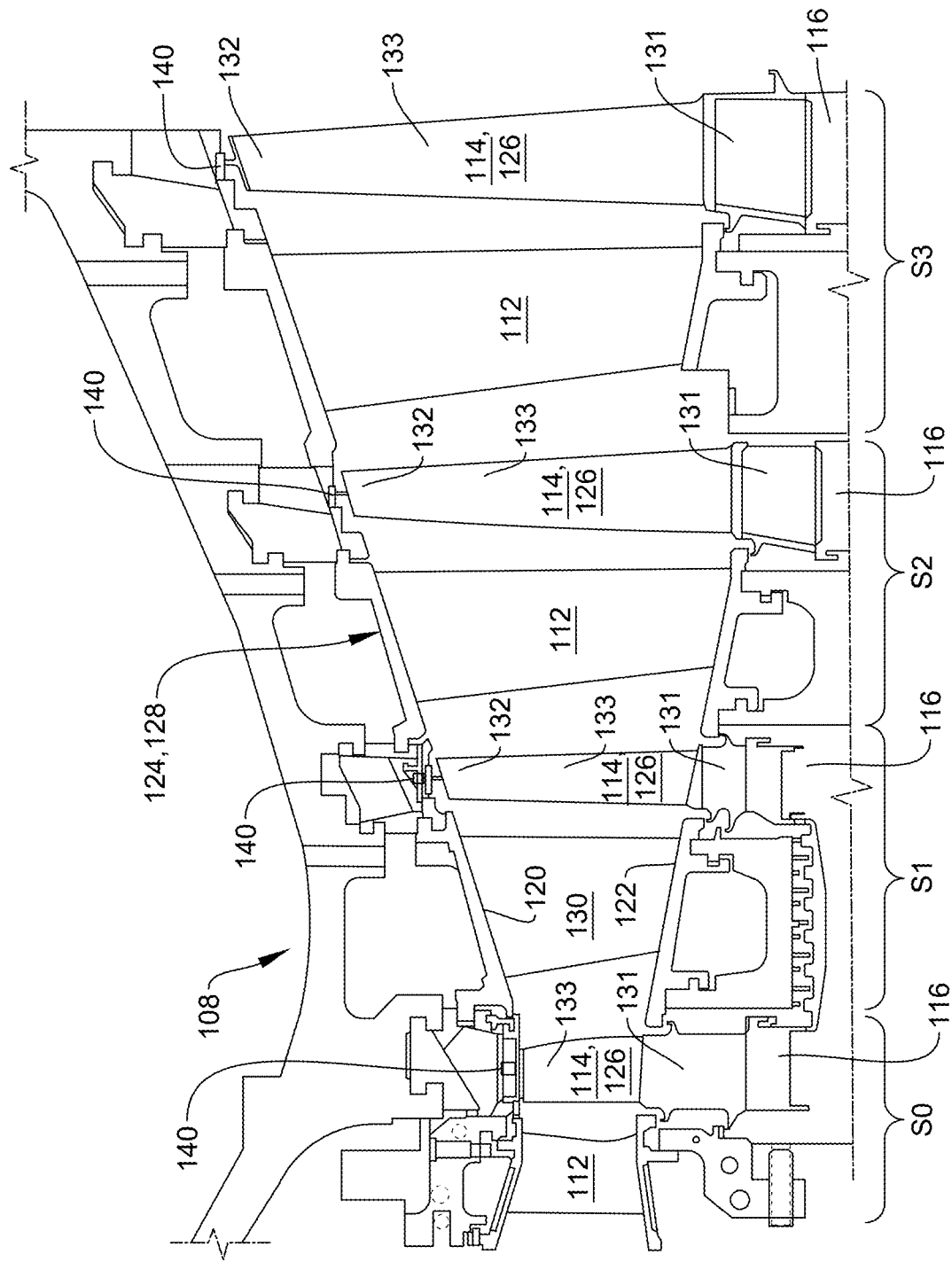
FIG. 2 is a cross-section view of an illustrative turbine section with four stages that may be used with the GT system in FIG. 1.

FIG. 2 shows a cross-section view of an illustrative non-limiting portion of turbine section 108 with four stages S0-S3 that may be used with GT system 100 in FIG. 1. The four stages are referred to as S0, S1, S2, and S3. Stage S0 is the first stage and is the smallest (in a radial direction) of the four stages. Stage S1 is the second stage and is the next stage in an axial direction. Stage S2 is the third stage and is the next stage in an axial direction. Stage S3 is the fourth, last stage and is the largest (in a radial direction). It is to be understood that four stages are shown as one non-limiting example only, and each turbine section may have more or less than four stages.

A set of stationary vanes or nozzles 112 cooperate with a set of rotating blades 114 to form each stage S0-S3 of turbine section 108 and to define a portion of a flow path through turbine section 108. Rotating blades 114 in each set are coupled to a respective rotor wheel 116 that couples them circumferentially to rotor shaft 110 (FIG. 1). That is, a plurality of rotating blades 114 are mechanically coupled in a circumferentially spaced manner to each rotor wheel 116. A stationary casing 124 includes stationary nozzles 112 circumferentially spaced around rotor shaft 110. Each nozzle 112 may include at least one platform (or platform) 120, 122 connected with airfoil 130. In the example shown in FIG. 2, nozzle 112 includes a radially outer platform 120 and a radially inner platform 122. Radially outer platform 120 couples nozzle 112 to stationary casing 124 of turbine section 108. Each rotating blade 114 is part of the set of turbine blades circumferentially dispersed about rotor wheel 116 in a stage of turbine section 108. Each rotating blade 114 may include a root 131 coupling it to rotor wheel 116 and an airfoil 133 extending radially outward from root 131 to a tip or radial outer end 132 thereof. Each rotating blade 114 is an illustrative rotating component 126 according to embodiments of the disclosure, and stationary casing 124 is an illustrative stationary component 128 according to embodiments of the disclosure. The corresponding terms may be used interchangeably herein.

In operation, air flows through compressor section 102, and compressed air is supplied to combustor section 104. Specifically, the compressed air is supplied to fuel nozzle assembly 106 that is integral to combustor section 104. Fuel nozzle assembly 106 is in flow communication with combustors 105. Fuel nozzle assembly 106 is also in flow communication with a fuel source (not shown in FIG. 1) and channels fuel and air to combustor section 104. Combustor section 104 ignites and combusts fuel. Combustor section 104 is in flow communication with turbine section 108 (e.g., an expansion turbine) within which gas stream thermal energy is converted to mechanical rotational energy. Turbine section 108 includes plurality of rotating blades 114 within stationary casing 124. Rotating blades 114 are rotatably coupled to and drive rotor shaft 110. Compressor section 102 also is rotatably coupled to rotor shaft 110. In the illustrative embodiment, there is a plurality of combustors 105, each with their own fuel nozzle assemblies 106, in combustor section 104. At least one end of rotating rotor shaft 110 may extend axially away from turbine section 108 (or compressor section 102) and may be attached to a load or machinery (not shown), such as, but not limited to, a generator, a load compressor, and/or another turbine.

During operation of turbine section 108, as a working fluid (e.g., gas or steam) is directed across the blades' airfoils 133, each rotating blade 114 will initiate rotation of rotor shaft 110 (FIG. 1) and rotate about an axis defined by rotor shaft 110 (FIG. 1). It is understood that each blade 114 is configured to couple (mechanically couple via fasteners, welds, slot/grooves, etc.) with a plurality of similar or distinct blades (e.g., blades 114 or other blades) to form a set of blades in a stage of turbine section 108 (e.g., stage S0 in FIG. 2). Each blade 114 includes a tip or radial outer end 132 that passes in close proximity to stationary casing 124 (hereafter "casing 124"). Although blades 114 should be kept out of contact with casing 124, smaller clearances, i.e., distances, between casing 124 and blades 114 may improve various operational aspects of the turbomachine (e.g., efficiency and performance). As noted, measuring the clearance also may be relevant to product validation, health monitoring of the turbomachine, accuracy of feedback in control systems, and/or product diagnostics. Again, while the disclosure will be described in the setting of blade 114 within casing 124 of GT system 100, it will be recognized that the teachings of the disclosure can be applied to a wide variety of machines requiring clearance determination between a stationary component and a rotating component.

Figure 3:
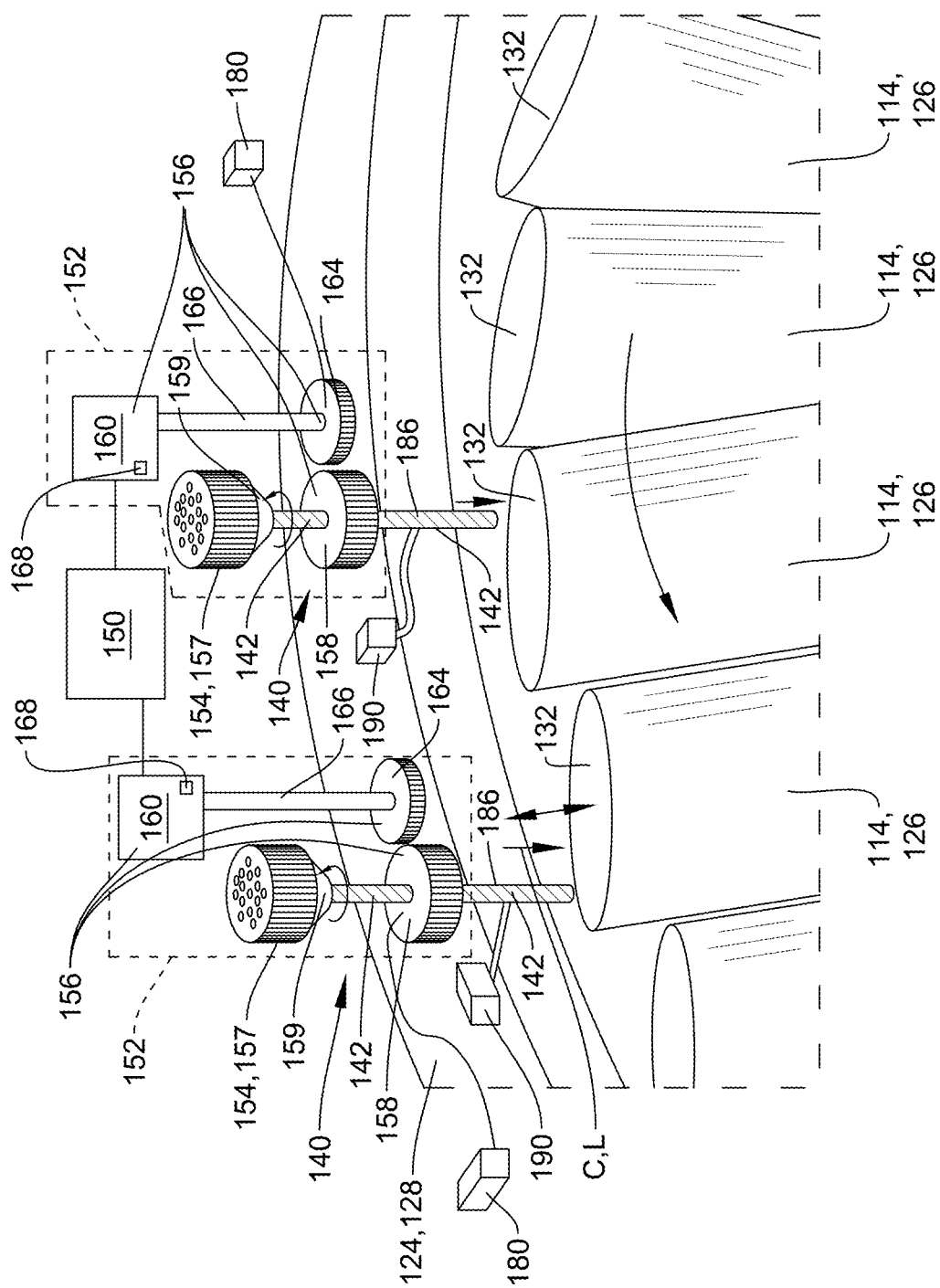
FIG. 3 shows an isometric elevational view of a stationary component of a turbine of a GT system, such as that shown in FIG. 2, showing two probe assemblies according to embodiments of the disclosure.

FIG. 3 shows an isometric elevational view of stationary component 128, e.g., casing 124, of turbine section 108 (FIGS. 1-2) of GT system 100 (FIG. 1), such as that shown in FIG. 2. FIG. 3 shows a two circumferentially spaced probe assemblies 140 for determining a clearance C between stationary component 128, e.g., casing 124, and rotating component 126, e.g., blade 114, according to embodiments of the disclosure. Probe assembly 140 includes an elongated clearance tip 142 extending from stationary component 128 toward rotating component 126. Elongated clearance tip 142 may include any length of material capable of extending from casing 124 to outer end 132 of blade 114. Elongated clearance tip 142 is referenced as "elongated" because it is longer in relation to its width. In one non-limiting example, clearance tip 142 may have a 0.2 millimeter maximum width compared to a minimum length of whatever the acceptable clearance C for a particular machine may be, e.g., 0.76 or more millimeters.

In certain embodiments, elongated clearance tip 142 (hereafter "clearance tip 142" for brevity) may include material that breaks when clearance tip 142 contacts with radial outer end 132 (hereafter "outer end 132") of blade 114, after which it can be replenished as will be further described. Clearance tip 142 is made of material(s) such that is has sufficient brittleness that it breaks when contacted by a blade 114, i.e., a longest blade or closest blade to casing 124. In certain embodiments, clearance tip 142 may include an electrically conductive material, which allows identification of contact of clearance tip 142 with outer end 132 of blade 114 when an electrical signal passes through clearance tip 142 and blade 114. In this case, clearance tip 142 may include but is not limited to graphite. In other embodiments, clearance tip 142 may include a piezoelectric material capable of indicating a strain applied thereto (i.e., caused by contact of clearance tip 142 with rotating component 126) in terms of an induced potential therein. Piezoelectric material may include but is not limited to: lead zirconate titanate (PZT), barium titanate, lead titanate, gallium nitride, zinc oxide or glass. Other sufficiently brittle material may also be used.

Probe assembly 140 also includes a controller 150 configured to determine clearance C between stationary component 128 and rotating component 126 based on a length L of clearance tip 142 extending from stationary component 128 at a time of contact with rotating component 126. That is, within GT system 100 (FIG. 1), controller 150 is configured to determine clearance C between casing 124 and blade 114 based on a (known) length L of clearance tip 142 extending from casing 124 at a time of contact with outer end 132 of blade 114. As will be described further, controller 150 can take a variety of forms depending on the mechanism used to determine clearance C and length L of clearance tip 142.

Figure 5:
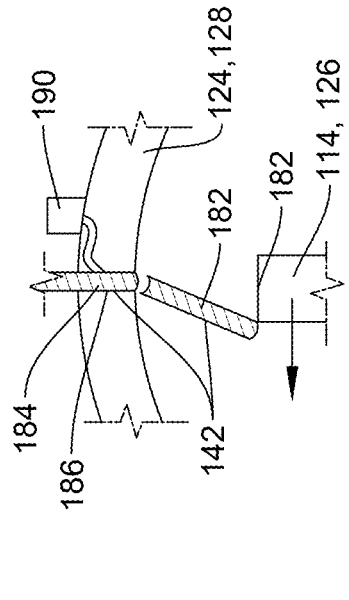
FIG. 5 shows a cross-sectional view of an elongated clearance tip breaking upon contacting the radial outer end of the rotating component according to embodiments of the disclosure.
Figure 4:
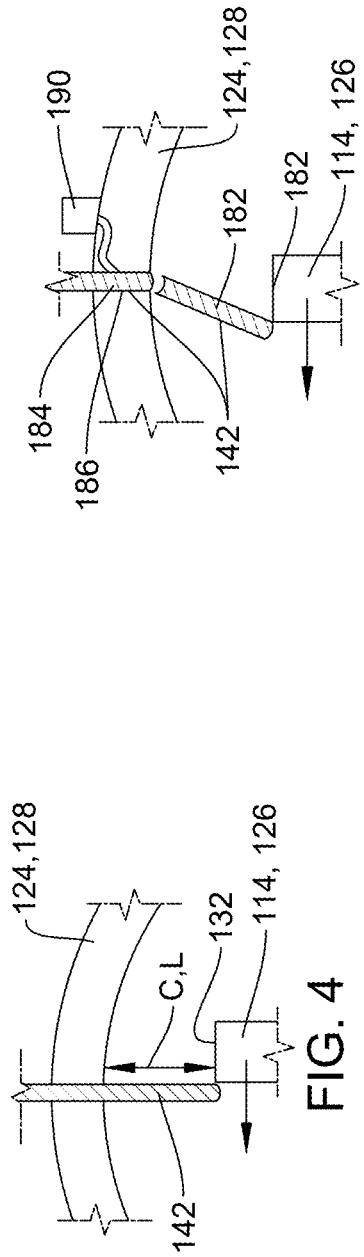
FIG. 4 shows a cross-sectional view of an elongated clearance tip contacting a radial outer end of a rotating component according to embodiments of the disclosure.

Probe assembly 140 also includes a tip advancement system 152 configured to advance a new elongated clearance tip 142 toward rotating component 126 from stationary component 128 in response to clearance tip 142 breaking from the contact with rotating component 126. FIG. 4 shows a cross-sectional view of clearance tip 142 contacting outer end 132 of rotating component 126, and FIG. 5 shows a cross-sectional view of clearance tip 142 breaking upon contacting outer end 132 of rotating component 126. As illustrated, clearance tip 142 breaks flush with whatever structure it passes through, which can be casing 124 or a structure of probe assembly 140 positioned in an opening but flush with casing 124. In order to replace clearance tip 142 after it breaks, tip advancement system 152 includes a supply 154 of new elongated clearance tip(s) 142 and an advancement mechanism 156 to advance a new clearance tip 142 from stationary component 128 toward rotating component 126. In FIG. 3, supply 154 is illustrated as a hopper 157 filled with lengths of clearance tip 142 and having a converging end 159 configured to dispense a single new clearance tip 142. Supply 154 may take other forms, e.g., in strips or belts like ammunition (coiled or straight).

Tip advancement system 152 may take a variety of forms to advance a new clearance tip 142 from stationary component 128. In the FIG. 3 example, tip advancement system 152 may include a screw advancement head 158 and a drive motor 160 operatively coupled to screw advancement head 158 to advance new elongated clearance tip 142 from stationary component 128. Screw advancement head 158 may include any now known or later developed structure to engage an outer surface of clearance tip 142 and, upon rotation thereof, move clearance tip 142 therethrough. Screw advancement head 158 may be similar to that used in a screw-based mechanical pencil. In FIG. 3, drive motor 160 is operatively coupled to screw advancement head 158 by a geared transmission 164. Geared transmission 164 may be coupled to drive motor 160 by an output shaft 166. Geared transmission 164 may include any variety and number of gears configured to turn screw advancement head 158. Accordingly, the arrangement shown is merely illustrative. In addition, it will be recognized that drive motor 160 may be operatively coupled to screw advancement head 158 by a variety of alternative transmissions, such as but not limited to: belt or chain drive transmissions with or without gearing, and direct coupling of output shaft 166 of drive motor 160 to screw advancement head 158.

Drive motor 160 is controlled by controller 150 to extend clearance tip 142 a known length from stationary component 128, e.g., in a graduated manner. In certain embodiments, drive motor 160 of tip advancement system 152 may further include an encoder 168 calibrated to identify the length L of new elongated clearance tip 142 extending from stationary component 128. Encoder 168 may include any now known or later developed electronic sensor capable of determining a rotational output, e.g., number of turns of output shaft 166 of drive motor 160 and correlate that information to length L that clearance tip 142 extends from stationary component 128, e.g., based on the structural arrangement of probe assembly 140 and/or empirical data. In other words, encoder 168 may measure how many rotations are made by output shaft 166 of drive motor 160, which can be used by controller 150 to determine length L of clearance tip 142 extended by screw advancement head 158.

Alternatively, clearance tip 142 could include uniformly spaced marks, e.g., dots, thereon and an optical device could monitor and count the passing of marks on the tip to identify its length. Controller 150 and encoder 168 may be calibrated using any now known or later developed method. In one non-limiting example, drive motor 160, encoder 168 and screw advancement head 158 may be operationally configured to turn a set number of turns of drive motor 160 to introduce a new clearance tip 142 from supply 154, and another set number of turns of drive motor 160 to extend clearance tip 142 a predefined length L, e.g., 0.7 millimeters, from casing 124. It will be recognized that encoder 168 may be an integral part of drive motor 160, i.e., it is part of circuitry to identify a number of turns of output shaft 166 of drive motor 160.

Figure 6:
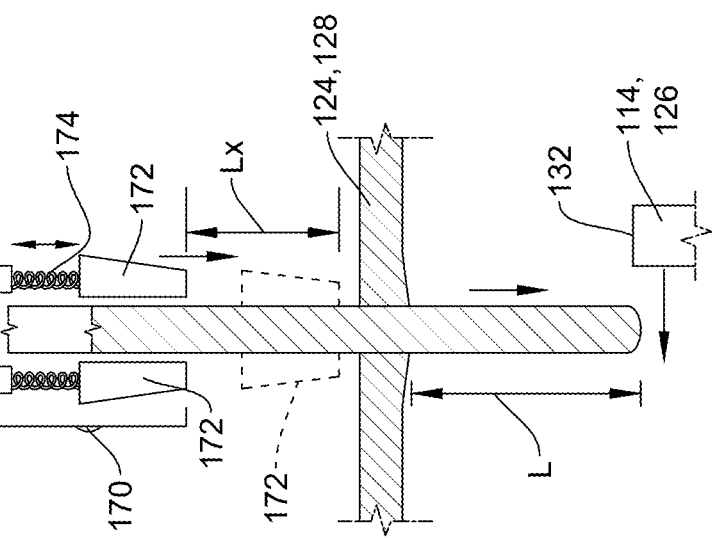
FIG. 6 shows a schematic cross-sectional view of a tip advancement system including a spring-loaded clutch to advance a new elongated clearance tip according to other embodiments of the disclosure.

In another embodiment, shown in the schematic cross-sectional view of FIG. 6, tip advancement system 152 may include a spring-loaded clutch 170 configured to advance the new elongated clearance tip 142 from stationary component 128 by a predetermined length Lx with each activation thereof. Spring-loaded clutch 170 may include any now known or later developed clutch including grasping member(s) 172 capable of: from a start position (shown in solid lines in FIG. 6) temporarily engaging an outer surface of clearance tip 142 and linearly moving clearance tip 142 the predetermined length Lx (shown by dashed lines in FIG. 6), disengaging the outer surface of clearance tip 142, and retracting again to the start position. Spring-loaded clutch 170 may also include any now known or later developed spring-loaded transmission 174 coupled to an actuator 176, e.g., similar to those used in a clutch-type mechanical pencil. Actuator 176 is operatively coupled to controller 150 to be activated to extend clearance tip 142 a desired length Lx, e.g., with one or more activations of spring-loaded clutch 170. Other forms of spring-loaded clutches 170 may also be used.

Controller 150 can sense contact of clearance tip 142 with rotating component 126, e.g., outer end 132 of blade 114, in a number of different ways. In the FIG. 3 arrangement, controller 150 is operatively coupled to an impact sensor 180 configured to sense contact of clearance tip 142 with rotating component 126. Impact sensor 180 may include any now known or later developed system capable of identifying clearance tip 142 breaking, such as an accelerometer. Here, clearance tip 142 may be extended over time a known length L until an impact with rotating component 126 is sensed by impact sensor 180. The last known length L indicates clearance C of rotating component 126 from stationary component 128.

In another embodiment, as described previously, clearance tip 142 may include an electrically conductive material. In this situation, controller 150 may detect contact of clearance tip 142 with rotating component 126 in response to sensing of an electrical signal communicating through clearance tip 142 and rotating component 126. The instantaneous electrical signal created by the closing of the circuit by clearance tip 142 contacting rotating component 126, e.g., outer end 132 of blade 114, and the known length that clearance tip 142 extends from stationary component 128 indicates clearance C.

In another embodiment, as noted previously, clearance tip 142 may include a piezoelectric material. In this arrangement, controller 150 detects contact of clearance tip 142 with rotating component 126 in response to sensing of an electrical signal (i.e., change in potential) communicating through clearance tip 142 and rotating component 126. For example, an electric signal could be generated by the piezoelectric material of clearance tip 142, where provided, when it breaks.

In another approach, a common ground may be provided between clearance tip 142 and rotating component 126 such that when contact happens, controller 150 registers the short.

In certain cases, as shown in FIG. 5, after a portion 182 of clearance tip 142 outside of stationary component 128 breaks off from impact with rotating component 126, a remaining portion 184 of clearance tip 142 may remain in stationary component 128, e.g., in a passage 186 through which clearance tip 142 extends. In order to ensure remaining portion 184 is removed to allow a new clearance tip 142 to be provided, probe assembly 140 may also include a pneumatic ejector 190 configured to eject remaining portion 184 of clearance tip 142 from a portion, e.g., passage 186, of stationary component 128. Pneumatic ejector 190 may include any now known or later developed system to provide a pulse of air into passage 186 to eject remaining portion 184 of clearance tip 142 therefrom. Controller 150 may provide the air pulse in response to clearance tip 142 breaking from the contact with rotating component 126.

Embodiments of the disclosure, as shown in FIG. 1, also include GT system 100 including compressor section 102, combustor section 104, and turbine section 108. As shown in FIG. 2, turbine section 108 includes a plurality of rotating blades 114 within casing 124. GT system 100 also includes probe assembly 140, as described herein, for determining clearance C between casing 124 and at least one of plurality of rotating blades 114. As shown for example in FIG. 3, probe assembly 140 includes elongated clearance tip 142 extending from casing 124 toward plurality of rotating blades 114. Probe assembly 140 also includes controller 150 configured to determine clearance C between casing 124 and a closest blade 114 of plurality of rotating blades 114 based on a length L of elongated clearance tip 142 extending from casing 124 at a time of contact with the closest blade of plurality of rotating blades 114. The 'longest blade' or 'closest blade' 114 is the blade having an outer end 132 thereof closest to casing 124 and, hence, the blade that will first contact clearance tip 142 and define the (minimum) clearance C.

Probe assembly 140 also includes tip advancement system 152 configured to advance a new clearance tip 142 toward plurality of rotating blades 114 from casing 124 in response to clearance tip 142 breaking from the contact with the closest blade of plurality of rotating blades 114. In certain embodiments, as shown in FIG. 3, controller 150 may be operatively coupled to impact sensor 180 configured to sense contact of clearance tip 142 with the closest blade of plurality of rotating blades 114. In other embodiments, clearance tip 142 includes an electrically conductive material, e.g., graphite, and controller 150 detects contact of clearance tip 142 with the closest blade of the plurality of rotating blades 114 in response to sensing of an electrical signal communicating through clearance tip 142 and the closest blade of plurality of rotating blades 114. In another embodiment, clearance tip 142 includes a piezoelectric material. Here, controller 150 may detect contact of clearance tip 142 with the closest blade of plurality of rotating blades 114 in response to sensing of an electrical signal (i.e., change in potential) communicating through clearance tip 142 and the closest blade of plurality of rotating blades 114 (prior to it breaking).

As described herein, tip advancement system 152 includes a supply 154 of new clearance tip(s) 142 and a mechanism for advancing new elongated clearance tip(s) 142 from casing 124 toward plurality of rotating blades 114. The advancing mechanism may include screw advancement head 158 and drive motor 160 operatively coupled to screw advancement head 158 to advance a new clearance tip 142 from casing 124. Drive motor 160 may be operatively coupled to screw advancement head 158 by any transmission, e.g., a geared transmission. Drive motor 160 may include encoder 168 calibrated to identify length L of new clearance tip 142 extending from casing 124, i.e., at time of contact with the closest blade. In other embodiments, the advancing mechanism includes spring-loaded clutch 170 configured to advance a new clearance tip 142 from casing 124 by a predetermined length Lx (FIG. 6) with each activation thereof. As shown in FIG. 5, probe assembly 140 may also include pneumatic ejector 190 configured to eject remaining portion 184 of clearance tip 142 from a portion, e.g., passage 186, of casing 124 in response to clearance tip 142 breaking from the contact with the closest blade of plurality of rotating blades 114.

In accordance with embodiments of the disclosure, any number of probe assemblies 140 can be used within a given machine, e.g., a given stage S0-S3 (FIG. 3) of turbine section 108 (FIG. 2) of GT system 100 (FIG. 1). In FIG. 3, two probe assemblies 140 are shown in a circumferentially spaced manner within casing 124. In this manner, clearance C at different circumferential locations of a given stage of turbine section 108 (FIG. 2) can be determined. It is emphasized, however, that one, three or more probe assemblies 140 can be used within a given stage. In certain embodiments, four probe assemblies 140 may be used around casing 124 of GT system 100 (FIG. 1) to determine how out-of-round the casing may be, e.g., one on top, one on bottom and two at the opposing mid-joints of casing 124. In addition, one or more probe assemblies 140 can be used at any number of stages S0-S3 (FIG. 2) of turbine section 108 (FIG. 2).

Figure 7:
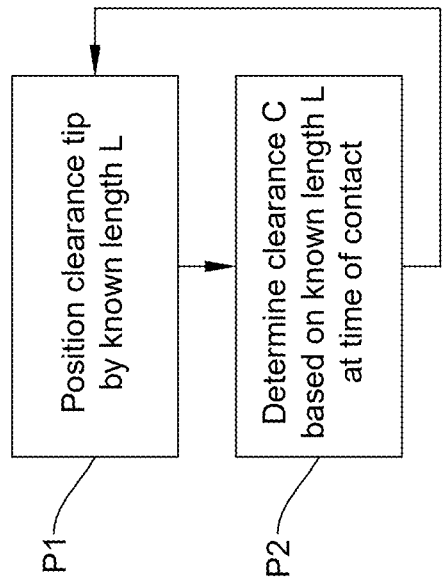
FIG. 7 shows a flow diagram of the method according to embodiments of the disclosure.

Embodiments of the disclosure also include a method of determining clearance C of rotating component 126 from stationary component 128 in GT system 100 (FIG. 1). FIG. 7 shows a flow diagram of the method according to embodiments of the disclosure. The method may include probe assembly 140 repeatedly performing a number of processes P1-P2 to determine clearance C. In process P1, elongated clearance tip 142 is positioned extending from stationary component 128 toward rotating component 126 by a known length L. Clearance tip 142 can be extended from stationary component 128 in a graduated manner, with each gradation having a known length L. Known length L can be established in any manner described herein based on the type of tip advancement system 152 and/or controller 150 used. In process P2, controller 150 (perhaps with other structure) determines clearance C between stationary component 128, e.g., casing 124, and rotating component 126, e.g., blade 114, based on the known length L of clearance tip 142 extending from stationary component 128 at a time of contact of clearance tip 142 with rotating component 126. Process steps P1-P2 may repeat to identify changes and/or confirm clearance C at whatever locations a particular probe assembly 140 is used. The method may also be used for each probe assembly 140 used, e.g., four around a given axial location of a stationary component 128.

Embodiments of the disclosure provide various technical and commercial advantages, examples of which are discussed herein. For example, the contacting nature of the clearance tip of the probe assembly and the breakable and replenishable clearance tip eliminates the complexity of current non-contact probes. The probe assembly also expands the application of the probe assembly beyond just characterization tests. The probe assembly provides accurate and repeatable clearance testing.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application of such technology and to enable others of ordinary skill in the art to understand the various embodiments of the present disclosure and the possibility of various modifications of the disclosed embodiments, as may be suited to the particular use(s) contemplated.

What is claimed is:

1. A probe assembly for determining a clearance between a stationary component and a rotating component, the probe assembly comprising:
   an elongated clearance tip extending from the stationary component toward the rotating component;
   a controller configured to determine a clearance between the stationary component and the rotating component based on a length of the elongated clearance tip extending from the stationary component at a time of contact with the rotating component; and
   a tip advancement system configured to advance a new elongated clearance tip toward the rotating component from the stationary component in response to the elongated clearance tip breaking from the contact with the rotating component.

2. The probe assembly of claim 1, wherein the controller is operatively coupled to an impact sensor configured to sense contact of the elongated clearance tip with the rotating component.

3. The probe assembly of claim 1, wherein the elongated clearance tip includes an electrically conductive material, and the controller detects contact of the elongated clearance tip with the rotating component in response to sensing of an electrical signal communicating through the elongated clearance tip and the rotating component.

4. The probe assembly of claim 1, wherein the elongated clearance tip includes a piezoelectric material, wherein the controller detects contact of the elongated clearance tip with the rotating component in response to sensing an electrical signal communicating through the elongated clearance tip and the rotating component.

5. The probe assembly of claim 1, wherein the tip advancement system includes a supply of the new elongated clearance tip and means for advancing the new elongated clearance tip from the stationary component toward the rotating component.

6. The probe assembly of claim 5, wherein the advancing means includes a screw advancement head and a drive motor operatively coupled to the screw advancement head to advance the new elongated clearance tip from the stationary component; and
   wherein the drive motor includes an encoder calibrated to identify a length of the new elongated clearance tip extending from the stationary component.

7. The probe assembly of claim 6, wherein the drive motor is operatively coupled to the screw advancement head by a geared transmission.

8. The probe assembly of claim 5, wherein the advancing means includes a spring-loaded clutch configured to advance the new elongated clearance tip from the stationary component by a predetermined length with each activation thereof.

9. The probe assembly of claim 1, further comprising a pneumatic ejector configured to eject a remaining portion of the elongated clearance tip from a portion of the stationary component in response to the elongated clearance tip breaking from the contact with the rotating component.

10. The probe assembly of claim 1, wherein the elongated clearance tip includes graphite.

11. A gas turbine (GT) system, comprising:
    a compressor section;
    a combustor section;
    a turbine section including a plurality of rotating blades within a stationary casing; and
    a probe assembly for determining a clearance between the stationary casing and at least one of the plurality of rotating blades, the probe assembly comprising:
    an elongated clearance tip extending from the stationary casing toward the plurality of rotating blades;
    a controller configured to determine a clearance between the stationary casing and a closest blade of the plurality of rotating blades based on a length of the elongated clearance tip extending from the stationary casing at a time of contact with the closest blade of the plurality of rotating blades; and
    a tip advancement system configured to advance a new elongated clearance tip toward the plurality of rotating blades from the stationary casing in response to the elongated clearance tip breaking from the contact with the closest blade of the plurality of rotating blades.

12. The GT system of claim 11, wherein the controller is operatively coupled to an impact sensor configured to sense the contact of the elongated clearance tip with the closest blade of the plurality of rotating blades.

13. The GT system of claim 11, wherein the elongated clearance tip includes an electrically conductive material, and the controller detects the contact of the elongated clearance tip with the closest blade of the plurality of rotating blades in response to sensing of an electrical signal communicating through the elongated clearance tip and the closest blade of the plurality of rotating blades.

14. The GT system of claim 11, wherein the elongated clearance tip includes a piezoelectric material, wherein the controller detects the contact of the elongated clearance tip with the closest blade of the plurality of rotating blades in response to sensing an electrical signal communicating through the elongated clearance tip and the closest blade of the plurality of rotating blades.

15. The GT system of claim 11, wherein the tip advancement system includes a supply of the new elongated clearance tip and means for advancing the new elongated clearance tip from the stationary casing toward the plurality of rotating blades.

16. The GT system of claim 15, wherein the advancing means includes a screw advancement head and a drive motor operatively coupled to the screw advancement head to advance the new elongated clearance tip from the stationary casing; and
    wherein the drive motor includes an encoder calibrated to identify a length of the new elongated clearance tip extending from the stationary casing.

17. The GT system of claim 16, wherein the drive motor is operatively coupled to the screw advancement head by a geared transmission.

18. The GT system of claim 15, wherein the advancing means includes a spring-loaded clutch configured to advance the new elongated clearance tip from the stationary casing by a predetermined length with each activation thereof.

19. The GT system of claim 11, further comprising a pneumatic ejector configured to eject a remaining portion of the elongated clearance tip from a portion of the stationary casing in response to the elongated clearance tip breaking from the contact with the closest blade of the plurality of rotating blades.

20. A method of determining clearance of a rotating component from a stationary component in a gas turbine system, the method comprising iteratively:

positioning an elongated clearance tip extending from the stationary component toward the rotating component by a known length;

determining a clearance between the stationary component and the rotating component based on the known length of the elongated clearance tip extending from the stationary component at a time of contact of the elongated clearance tip with the rotating component; and advancing a new elongated clearance tip via a tip advancement system toward the rotating component from the stationary component in response to the elongated clearance tip breaking from the contact with the rotating component.

* * * * *